United States Patent
Zhang

(10) Patent No.: US 6,937,809 B1
(45) Date of Patent: Aug. 30, 2005

(54) VARIABLE ATTENUATOR OPTICAL ADD/DROP DEVICES

(75) Inventor: Yale Zhang, Sunnyvale, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 521 days.

(21) Appl. No.: 10/132,855

(22) Filed: Apr. 25, 2002

Related U.S. Application Data

(60) Provisional application No. 60/365,653, filed on Mar. 18, 2002.

(51) Int. Cl.$^7$ .............................. G02B 6/00; G02B 6/32
(52) U.S. Cl. ......................... 385/140; 385/24; 385/34; 385/14; 385/31
(58) Field of Search ............................ 385/24, 47, 140

(56) References Cited

U.S. PATENT DOCUMENTS

| | | | |
|---|---|---|---|
| 5,745,634 A | 4/1998 | Garrett et al. ............... | 385/140 |
| 6,246,812 B1 | 6/2001 | Liu et al. ...................... | 385/34 |
| 6,292,616 B1 | 9/2001 | Tei et al. ...................... | 385/140 |
| 6,381,049 B1 * | 4/2002 | Xu et al. ...................... | 398/82 |
| 6,553,175 B2 * | 4/2003 | Jaspan ......................... | 385/140 |

* cited by examiner

*Primary Examiner*—Akm Enayet Ullah
*Assistant Examiner*—Kevin S. Wood
(74) *Attorney, Agent, or Firm*—Joe Zheng; C. P. Chang

(57) ABSTRACT

Optical devices for adding/dropping an optical signal with a particular wavelength are disclosed. According to embodiment, a reflection channel module including a grin lens and a bandpass filter is employed to transmit the optical with a particular wavelength and reflect all other channel signals. The transmitted signal is regulated by an optical regulator (e.g. variable optical attenuator) before it is output from the device via a grin lens. As a result, a regulated channel can be dropped or added depending on an application.

10 Claims, 8 Drawing Sheets

VARIABLE ATTENUATOR OPTICAL ADD/DROP DEVICES

CROSS-REFERENCE TO RELATED APPLICATION

This application claims the benefits of U.S. Provisional Application No. 60/365,653, filed Mar. 18, 2002, and entitled "Dynamic Multi-channel Power Equalizer and Regulator and Variable Attenuator Optical Drop/Add Port," which is hereby incorporated by reference for all purposes. This application is related to U.S. application Ser. No. 10/038,079 filed Jan. 02, 2002, and entitled "Electrically Controlled Variable Optical Attenuator with Potentiometer," which is hereby incorporated by reference.

BACKGROUND OF THE INVENTION

1. Field of the Invention

The invention is generally related to the area of optical communications. In particular, the invention is related to a method and apparatus for regulating optical channel signals with specified wavelengths.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

Transmitting several channels in a single optical fiber requires a process of combining several channel signals at different wavelengths to be multiplexed or interleaving a multiplexed into several channel signals. From a terminology's viewpoint, a device that multiplexes different wavelength channels or groups of channels into one fiber is a multiplexer, and a device that divides the multiplexed channels or groups of channels into individual or subgroups of channels is a demultiplexer. Specifically, when a multiplexer combines two streams of spectrum-periodic optical signals into a single, denser spectrum-periodic signal stream, or in reverse, a demultiplexer separates a single spectrum-periodic signal stream into two complementary spectrum-periodic signal streams, such multiplexer/demultiplexer is called an interleaver.

In general, each of the channel signals comes from a different source and may have transmitted over different mediums, resulting in a different power level. Without equalizing the power levels of the channel signals that are to be combined or multiplexed, some channels in a multiplexed signal may be distorted as a result of various stages of processing the multiplexed signal. On the other hand, many optical devices or systems would not function optimally when incoming signals are beyond a predetermined signal level range. In fact, the power of the incoming signals shall not be too low, neither too high. To ensure that all optical devices or systems receive proper levels of optical signals, attenuation devices are frequently used to adjust the optical signals before they reach an optical device.

Many existing optical attenuation devices lack accuracy and have high feedback noise. Some can not adapt to the power changes in the signals being attenuated or the environmental changes. There is, therefore, a need for techniques capable of dynamically attenuating channel signals.

In WDM and dense WDM (DWDM) systems, it is often needed to select a signal with a particular wavelength from a multiplexed signal with a group of wavelengths. This is advantageous in order to drop/add the same or different channel signals at various points within an optical network. Optical add/drop devices are often employed to add/drop one or more of these channel signals. Thus, it is desirable to have an add/drop device capable of attenuating signals added or dropped.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of optical devices and methods for regulating optical channel signals with specified wavelengths. According to one aspect of the present invention, a number of variable optical apparatuses are employed. Each of the variable optical apparatuses includes a first and a second optical channel module, referring to as R and T channel module, both configured at a wavelength $\lambda 1$. Each of the variable optical apparatuses further includes an optical regulator (i.e. a neutral density filter controlled by a stepper motor) coupled between the first and second optical channel modules.

When signals with different wavelengths arrive, only the signal with the wavelength $\lambda i$ will transmit through the R-channel module and the rest are reflected off. The signal is then regulated (i.e. attenuated or strengthened) accordingly by the optical regulator before transmitting through the T-channel. Hence, the signals with different wavelengths can be respectively regulated by one of the variable optical apparatuses. As a result, the signals can be well regulated before transmitted to devices or networks.

To provide dynamic regulation of a signal, according to one embodiment of the present invention, a pair of photodetectors are used to measure signal strengths of the signal before and after being regulated by the optical regulator. In addition, a potentiometer is employed to precisely measure a position of the optical regulator (e.g. a neutral density filter) regulating the signal. The measurements from the photodetectors as well as the potentiometer are used to produce one or more control signals that, in turn, control the operation of the stepper motor.

According to another aspect of the present invention, certain configuration of the optical devices are employed to form an optical add/drop device that is, for example, often used to add/drop signals with one or more particular wavelengths in WDM and dense WDM (DWDM) systems.

There are numerous benefits, features, and advantages in the present invention. One of them is the lowest possible back reflection. Reflection of the outgoing signal back to a source (e.g. a transmitter) could lead to feedback noise and can deteriorate the quality of the transmission of the optical signal. Another one of the benefits, features, and advantages in the present invention is the feedback control provided in the user of the photodetectors and/or the potentiometer so as to compensate for some environmental factors such as temperature changes, polarization changes, vibration, and humidity.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other Instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1–7B. However, those skilled in the art will readily appreciate that the detailed description given herein with respect to these figures is for explanatory purposes as the invention extends beyond these limited embodiments.

Figure 1:
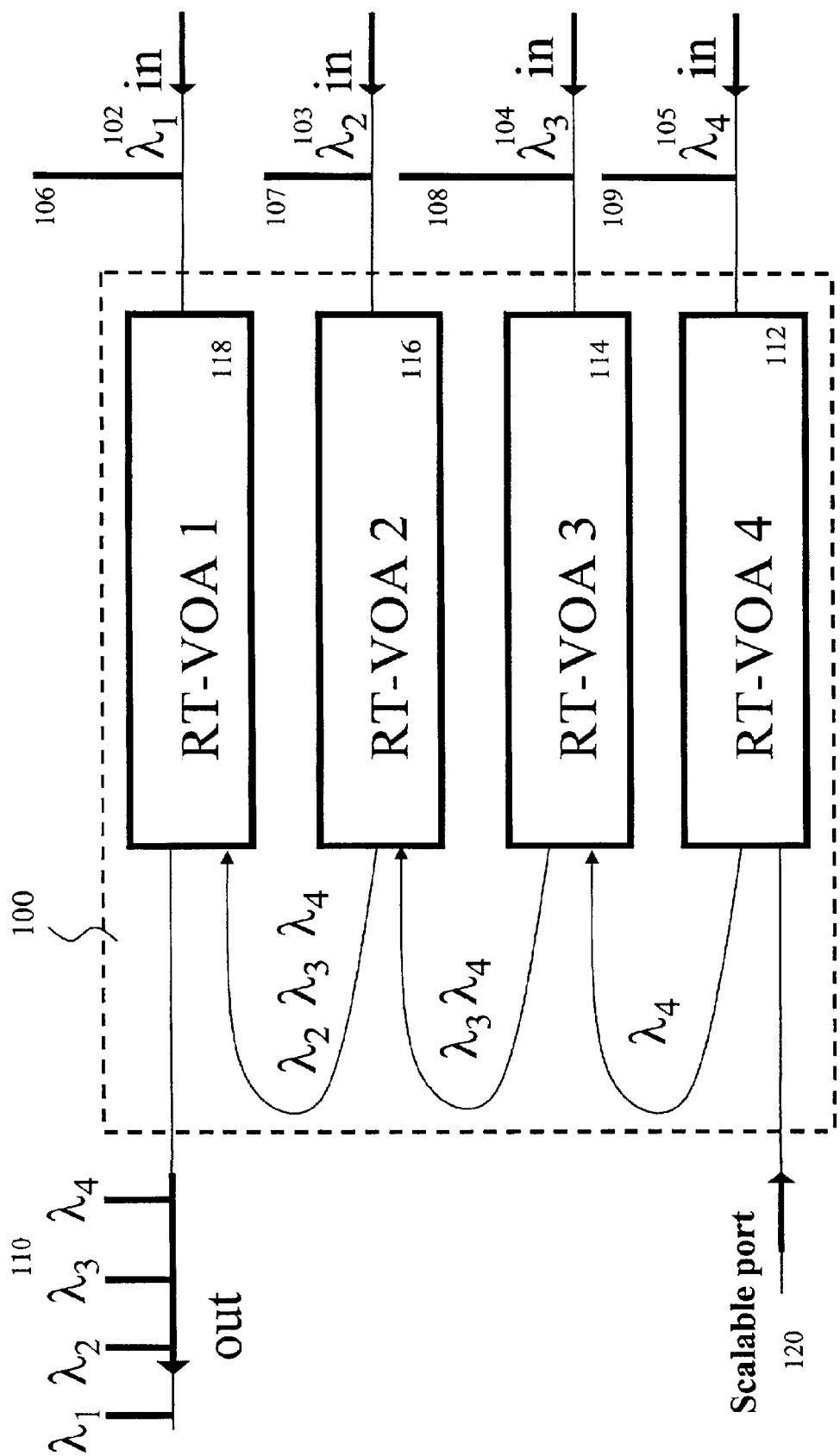
FIG. 1 shows an optical device for dynamically regulating channel signals according to one embodiment of the invention.

FIG. 1 shows an optical device 100 for dynamically regulating channel signals according to one embodiment of the invention. The optical device 100 is utilized to regulate the signal strengths of channel signals received at one end and output regulated channel signals at another end. As used herein, "regulate" means "equalize", "process", "attenuate" or "strengthen" depending on implementation and application. In general, an optical signal at a particular wavelength needs to be attenuated or sometimes strengthened to be within a desirable range. For that purpose, interchangeably herein, it is referred to that an optical signal at a particular wavelength is equalized or processed by the optical device 100.

In particular, FIG. 1 shows that four separate channel signals 102–104 are received at the equalizer 100, each of the four separate channel signals 102–105 has a wavelength at $\lambda_1$, $\lambda_2$, $\lambda_3$, or $\lambda_4$ and a different signal strength 106, 107, 108 or 109. The four separate channel signals 102–104 are equalized in the equalizer 100 that in turn outputs a signal 110 with four equalized channel signals $\lambda_1$, $\lambda_2$, $\lambda_3$, and $\lambda_4$.

According to one embodiment, the equalizer 100 includes four Reflection/Transmission Variable Optical Attenuators 112, 114, 116 and 118, each being referred to as a RT-VOA herein. To regulate only one wavelength, each RT-VOA is configured to process that wavelength and bypass or reflect other wavelengths. For example, when $\lambda_4$ is received at RT-VOA 112, the signal at $\lambda_4$ is transmitted through to be regulated therein accordingly. When $\lambda_3$ is received at RT-VOA 114, the signal at $\lambda_3$ is transmitted through, wherein it is regulated accordingly as well. However, the signal $\lambda_4$ is coupled to RT-VOA 114 that is configured to process $\lambda_3$ and hence bypasses or reflects $\lambda_4$ together with $\lambda_3$ output from RT-VOA 114 to RT-VOA 116. The same processes happen to RT-VOA 116 and RT-VOA 118, respectively, with signals $\lambda_2$ and $\lambda_1$. Subsequently, four processed (equalized) signals at $\lambda_1$, $\lambda_2$, $\lambda_3$ and $\lambda_4$ are output from RT-VOA 118. Nevertheless, it should be noted that only the signal at $\lambda_1$ has been regulated in RT-VOA 118.

The optical equalizer 100 in FIG. 1 shows that there are four variable optical attenuators 112, 114, 116 and 118. It is understanble to those skilled in the art that more variable optical attenuators may be employed to accommodate more wavelengths. To provide the scalability of the optical device 100, a scalable port 120 is also provided as such a number of optical equalizers may be cascaded to accommodate more different wavelengths.

Figure 2:
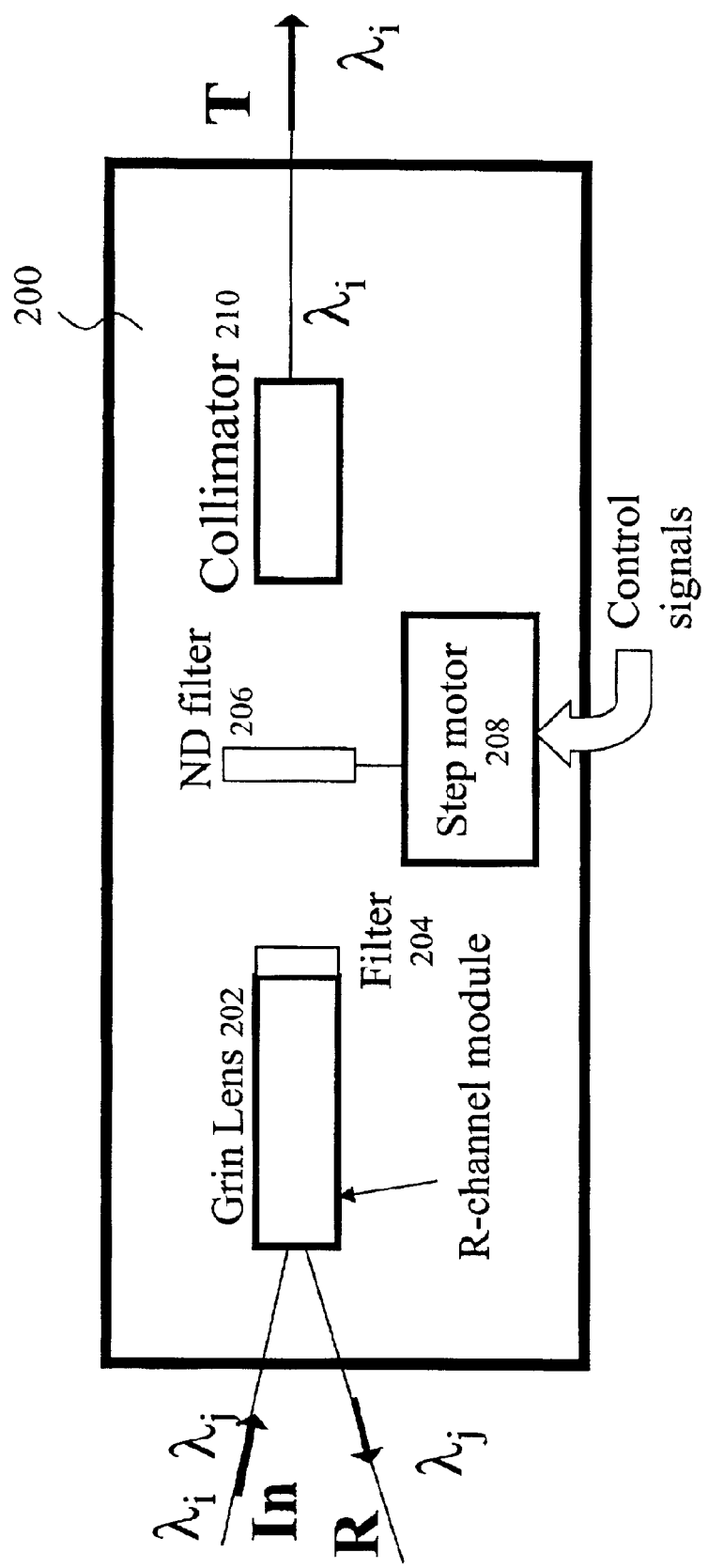
FIG. 2 illustrates an internal structure of an RT-VOA (Variable Optical Attenuator) according to one embodiment of the present invention.

FIG. 2 illustrates an internal structure of an exemplary RT-VOA 200 according to one embodiment of the present invention. As shown in FIG. 2, the RT-VOA 200 includes a grin lens 202, an optical filter 204 (e.g. a WDW filter), a neutral density filter 206, a step motor 208 and a collimator 210. Optically, the grin lens 202 and the optical filter 204 form a R-channel module that reflects signals other than at wavelength $\lambda_i$. In other words, when two signals at $\lambda_i$ and $\lambda_j$ arrive at the RT-VOA 200, the signal at $\lambda_i$ passes through the R-channel module while the signal at $\lambda_j$ is reflected out by the R-channel module (essentially by the optical filter 204). At the same time, the signal at $\lambda_i$ transmits through the R-channel module and is then regulated by the neutral density filter 206.

According to one embodiment, the neutral density filter 206 is controlled by the step motor 208 that is further controlled by one or Imore control signals. Depending on implementation and application, the control signals can be provided manually or from a computing device. Again, depending on the control signals that control the step motor 208, the density filter 206 attenuates, regulates or equalizes the signal at $\lambda_i$ to a desired level. Detailed description of one embodiment that utilizes a neutral density filter is provided in U.S. Pat. application Ser. No.: 10/038,079. The equalized signal is collected by the following collimator 210 that subsequently couples the equalized signal out of the RT-VOA 200.

Figure 3:
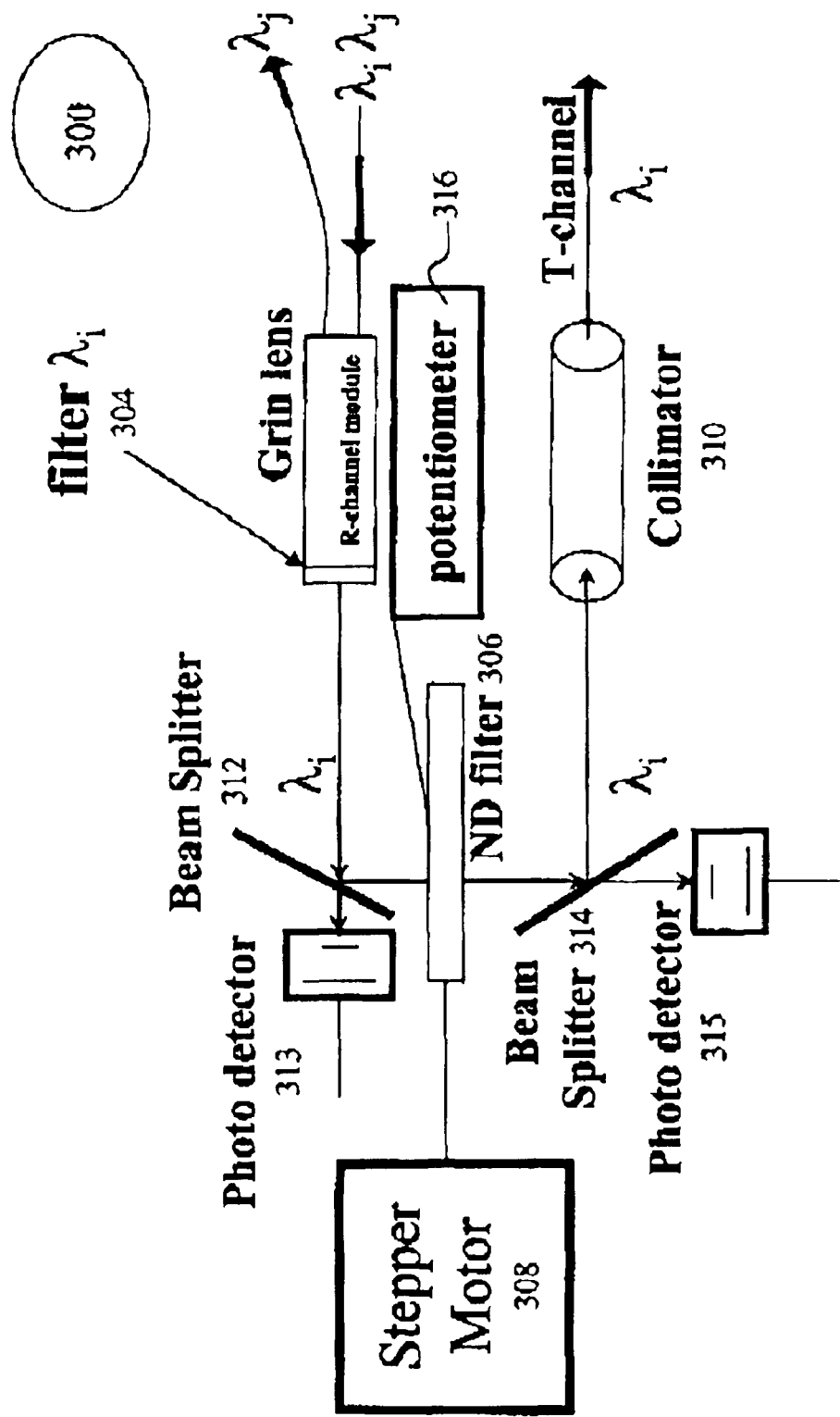
FIG. 3 shows another embodiment of an RT-VOA (Variable Optical Attenuator) that utilizes a pair of beam splitters and, a pair of corresponding photo detectors and, and a potentiometer.

Referring now to FIG. 3, there is shown another embodiment of an RT-VOA 300. Additional features in RT-VOA 300 over RT-VOA 200 of FIG. 2 include the use of a pair of beam splitters 312 and 314, a pair of corresponding photo detectors 313 and 315, and a potentiometer 316. In operation, a transmitted signal at $\lambda_l$ hits the beam splitter 312, a portion thereof is collected onto the photo detector 313 that measures the signal strength of the transmitted signal at $\lambda_l$ before it goes through the density filter 306. Similarly, after the signal at $\lambda_i$ goes through the density filter 206, the processed light hits the beam splitter 314 that samples a portion of the processed signal onto the photo detector 315 that now measures the strength of the processed signal at $\lambda_i$ after it goes through the neutral density filter 306. In addition, the potentiometer 316 is used to measure the density filter 306 how it is actually attenuating the signal. According to embodiment, the measurements from the photo detectors 313, 315 and the potentiometer 316 are coupled to a computing device that provides the control signals to the stepper motor 308. Based on the measurements of tapped or monitored signals by the photo detectors, the computing device is configured to determine or establish appropriate control signals to control the stepper motor 308 so that an accurate equalization of the channel signal at $\lambda_i$ can be performed.

Figure 4:
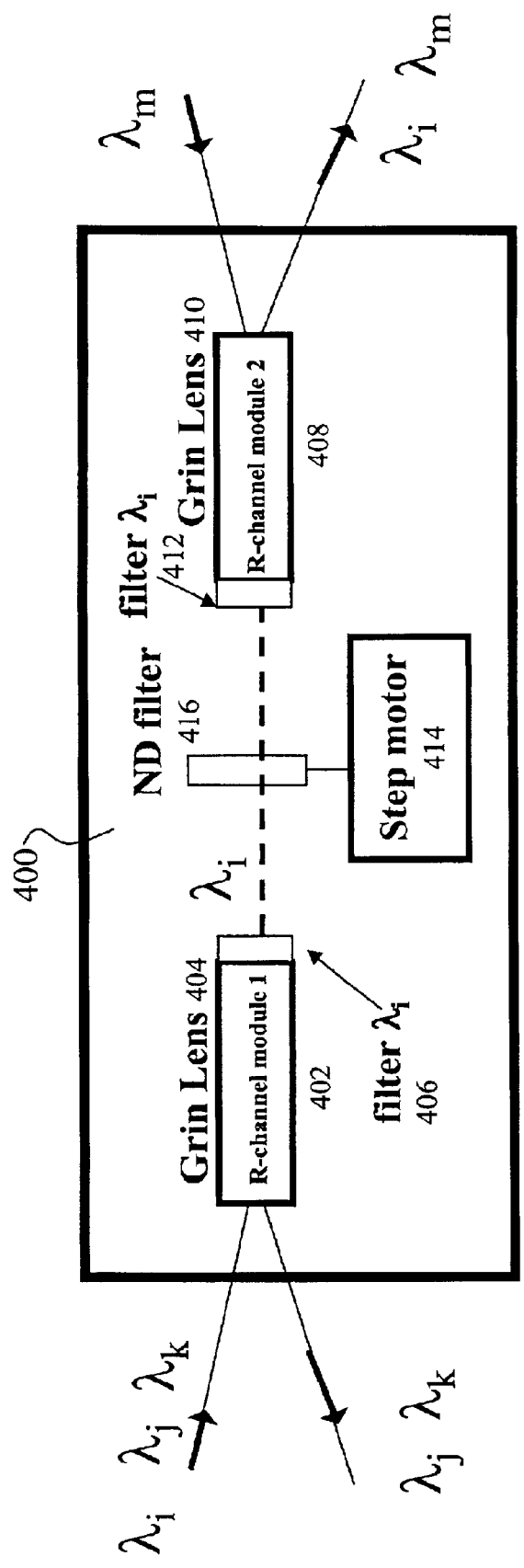
FIG. 4 shows an RR-VOA that essentially attenuates one channel signal in a multiplexed signal and outputs another multiplexed signal with the equalized channel signal.

To accommodate the need of demultiplexing and multiplexing functions at the same time, FIG. 4 shows an RR-VOA 400 that essentially attenuates one channel signal in a multiplexed signal and outputs another multiplexed signal with the equalized channel signal. As shown in FIG. 4, there are two R-channel modules 402 and 408, each Including a grin lens 404 or 410 and an optical filter 406 or 412. In operation, a multiplexed signal having wavelengths $\lambda_i$ $\lambda_j$ and $\lambda_k$ arrives at the RR-VOA 400. As the R-channel modules 402 is configured to process a signal only at $\lambda_i$, the signals at $\lambda_j$ and $\lambda_k$ are reflected out of the RR-VOA 400 while the signal at $\lambda_i$ transmits through the R-channel modules 402 and to be processed by the neutral density filter 416 controlled by a stepper motor 414. Like the R-channel modules 402, the R-channel module 408 is also configured to process the signal $\lambda_i$. Hence, the processed signal continues to travel through the R-channel module 408. At the same time, the R-channel module 408 receives a signal at $\lambda_m$ or another multiplexed signal having wavelengths other than $\lambda_i$. Operationally, the received signal at the R-channel module 408 is reflected out, but with the internally transmitted or processed signal at $\lambda_i$, the resultant output from the R-channel module 408 is signals at $\lambda_i$ and $\lambda_m$, a newly multiplexed signal.

Figure 5:
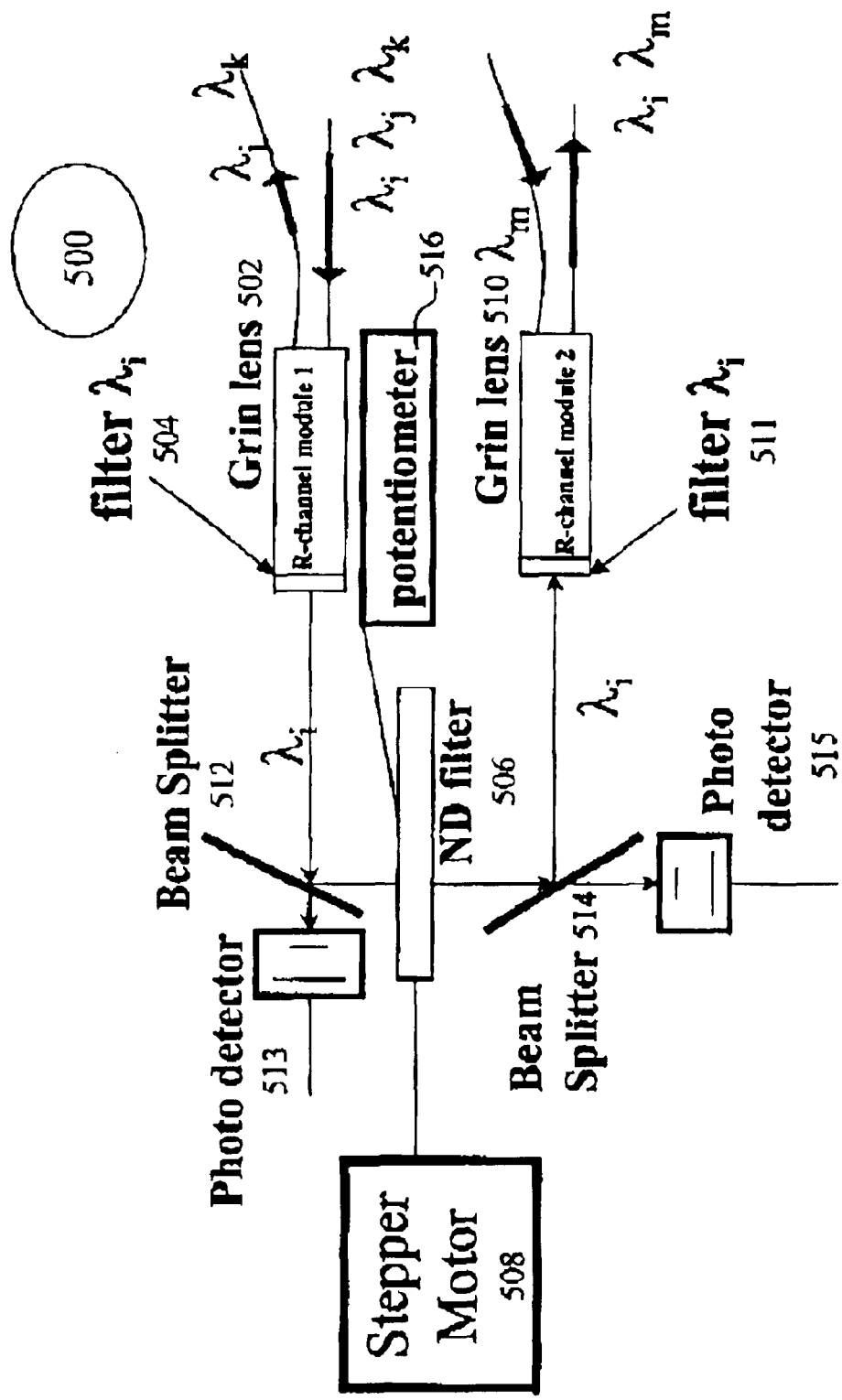
FIG. 5 shows another embodiment of an RR-VOA that utilizes a pair of beam splitters and, a pair of corresponding photo detectors and, and a potentiometer.

Similar to FIG. 3, FIG. 5 shows another embodiment of an RR-VOA 500 that utilizes a pair of beam splitters 512 and 514, a pair of corresponding photo detectors 513 and 515, and a potentiometer 516. In operation, a signal at $\lambda_i$ transmitting through a R-channel module 1 (including a grin lens 502 and a filter 504) hits the beam splitter 512, a portion thereof Is collected onto the photo detector 513 that measures the signal strength of the transmitted signal at $\lambda_i$ before it goes through the neutral density filter 506. Similarly, after the signal at $\lambda_i$ goes through the neutral density filter 506, the processed light hits the beam splitter 514 that samples a portion of the processed signal onto the photo detector 515 that now measures the strength of the processed signal at $\lambda_i$ after it goes through the neutral density filter 506. The processed signal continues to go through another R-channel module 2 (including a grin lens 510 and a filter 511) configured at the same wavelength. Subsequently, the processed signal is merged with a signals $\lambda_m$ received at the R-channel module 2 that outputs a newly multiplexed signal with wavelengths $\lambda_i$ and $\lambda_m$.

Figure 6:
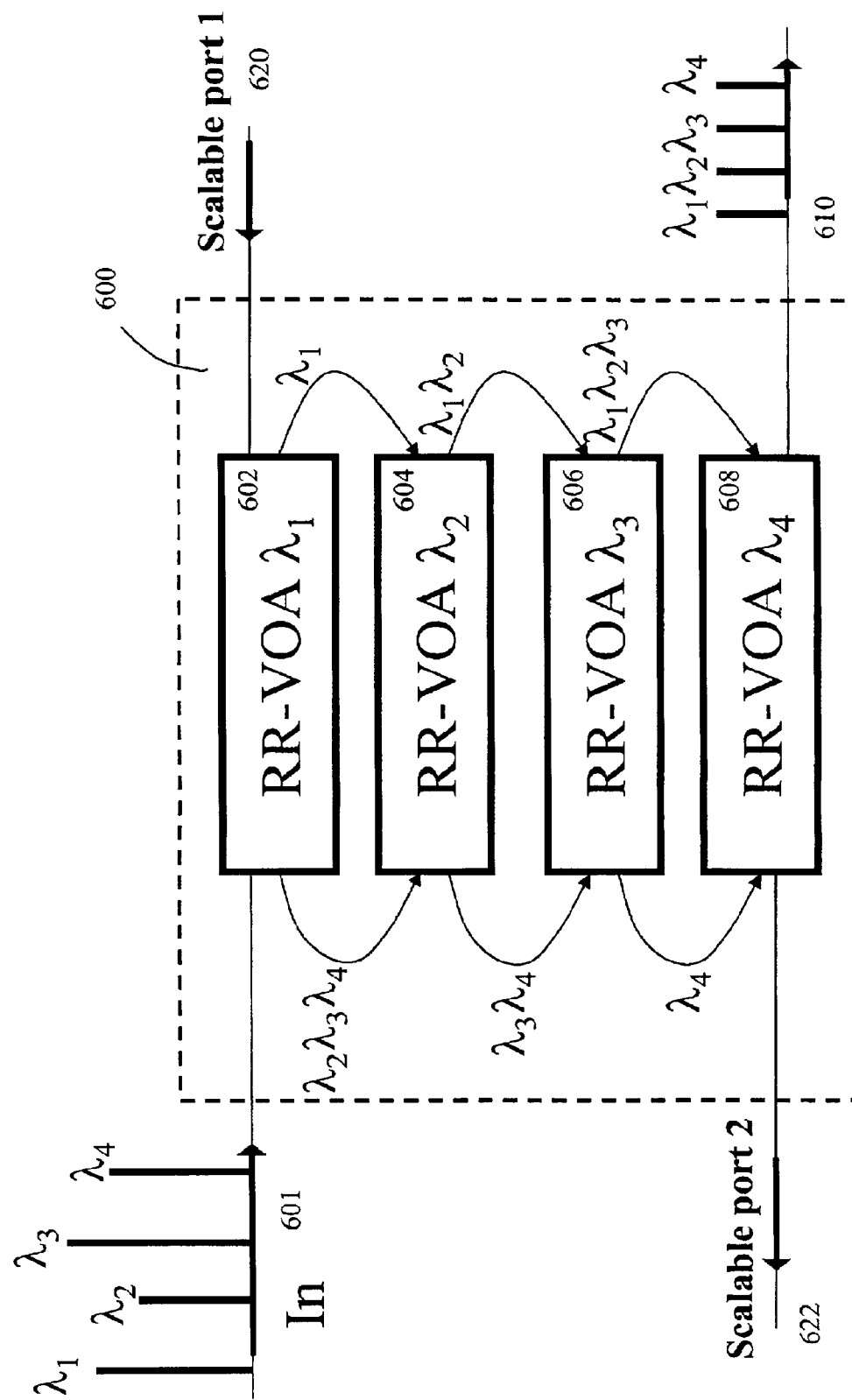
FIG. 6 shows an equalizer including four RR-VOAs, each may be corresponding to an RR-VOA shown in FIG. 4 or FIG. 5.

Referring now to FIG. 6, there is shown an equalizer 600 including four RR-VOAs 602, 604, 606 and 608, each may be corresponding to a RR-VOA shown in FIG. 4 or FIG. 5. The equalizer 600 receives a multiplexed signal 601 with four channels signals $\lambda_1$, $\lambda_2$, $\lambda_3$, and $\lambda_4$, each having a different signal strength. The signal 601 arrives at RR-VOAs 602 that is configured at $\lambda_1$, accordingly, only the channel signal $\lambda_1$ transmits into RR-VOAs 602, is attenuated therein accordingly and subsequently output therefrom. The attenuated signal $\lambda_1$ is then fed into RR-VOAs 602. At the same time, the rest of four channels signals, namely, $\lambda_2$, $\lambda_3$, and $\lambda_4$ are reflected by RR-VOAs 602 to RR-VOAs 604 that is configured at $\lambda_2$. Accordingly, the channel signal $\lambda_2$ is attenuated in RR-VOAs 604 and subsequently output together with the attenuated channel signal $\lambda_1$ from RR-VOAs 602. The process goes on with RR-VOAs 606 and RR-VOAs 608 for the rest of the four channels signals, namely $\lambda_3$, and $\lambda_4$. Finally, a multiplexed signal 610 is produced and the multiplexed signal 610 has four properly attenuated channel signals.

The optical equalizer 600 In FIG. 6 shows that there are four RR-VOAs 602, 604, 606 and 608 in use. It is understable to those skilled in the art that more RR-VOAs may be employed to accommodate more different wavelengths. To provide the scalability of the optical equalizer 600, two scalable ports 620 and 622 are provided as such a number of similar optical equalizers may be cascaded to accommodate more different wavelengths.

Figure 7A:
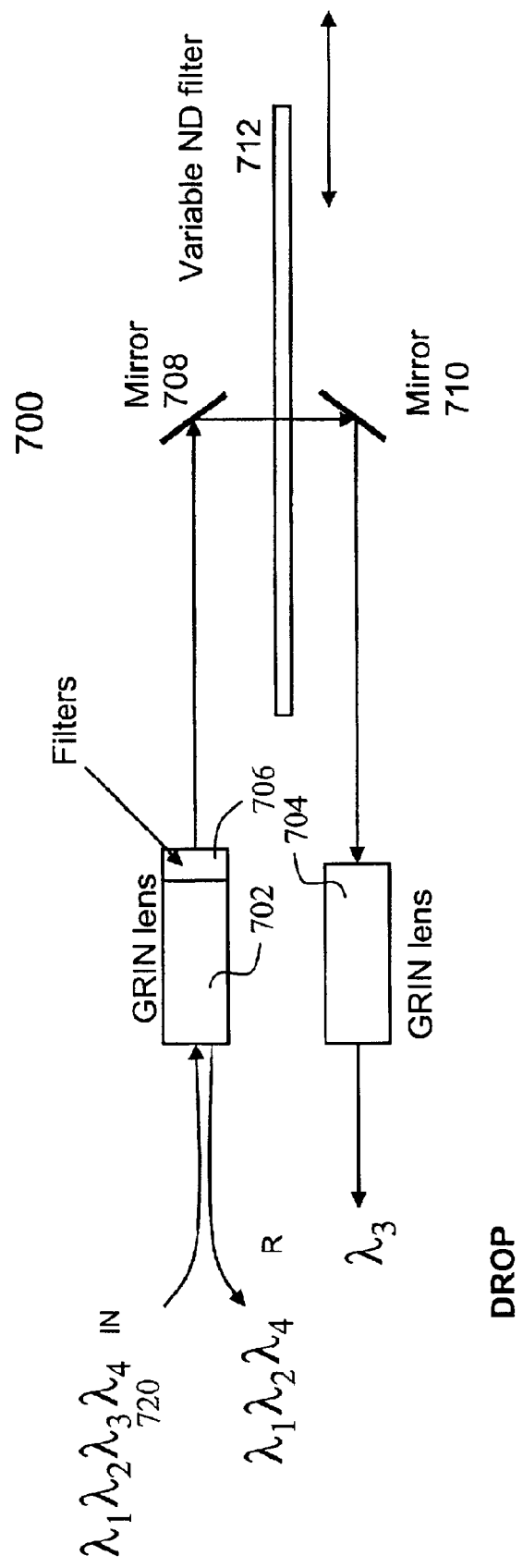
FIGS. 7A and 7B show a structure employing certain features in FIG. 3 or FIG. 5 to form an optical add/drop device.

Referring now to FIG. 7A, there is shown an add/drop optical device 700 according to one embodiment of the present invention. The optical device 700 includes a pair of grin lenses 702 and 704 and a pair of mirrors 708 and 710, a filter 706 and a variable neutral density filter 712. In operation, a multiplexed signal 720 with different wavelengths (e.g. $\lambda_1$, $\lambda_2$, $\lambda_3$, and $\lambda_4$) arrives and one of the wavelengths, for example, $\lambda_3$ needs to be dropped off. Accordingly, the filter 706 is so chosen that only wavelength $\lambda_3$ can pass through and block or bounce back others. In other words, the spectrum response profile of the filter 706 is centered at $\lambda_3$. The grin lens 702 receives the signal 720 and reflects out all except for $\lambda_3$. The transmitted channel signal $\lambda_3$ hits the mirror 708 that reflects the signal $\lambda_3$ though the variable neutral density filter 712. According to one embodiment, the variable neutral density filter 712 operates in a controlled manner so that a desired attenuation to the signal can be achieved. In one embodiment, the variable neutral density filter 712 is controlled by a stepper motor that is in turn controlled by one or more control signals determining how much the signal shall be attenuated.

Figure 7B:
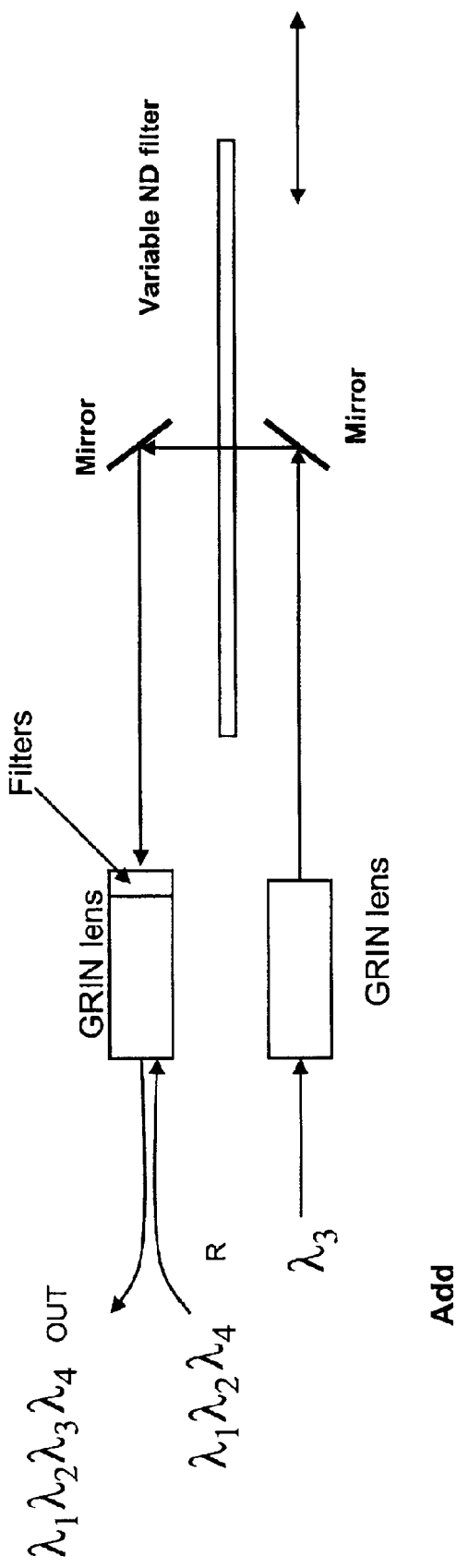

The attenuated signal hits the mirror 710 that reflects the signal onto a second grin lens 704 to output a dropped wavelength $\lambda_3$. Different from the prior art devices, the signal with the dropped wavelength can be dynamically regulated according to a need. For completeness, FIG. 7B shows the operation of adding a signal with a wavelength $\lambda_3$.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

I claim:

1. An optical device comprising:
   a first grin lens to receive a multiplexed signal having channel signals up to N respective wavelengths $\lambda_1 \lambda_2 \ldots \lambda_N$;
   an optical filter mounted with the first grin lens to bounce off all of the channel signals with the wavelengths $\lambda_1 \lambda_2 \ldots \lambda_N$ except for a signal with a wavelength $\lambda_i$, wherein i is inclusively between 1 and N, the optical filter has a bandpass frequency profile centered at $\lambda_i$.
   a variable neutral density filter;
   a first mirror receiving the signal with the wavelength $\lambda_i$ and reflecting the signal to the variable neutral density filter to be attenuated according to a desired level;
   a second grin lens;
   a second mirror receiving the attenuated signal from the variable neutral density filter and reflecting to the second grin lens that in turn outputs the attenuated signal.

2. An optical device as recited in claim 1, wherein the variable neutral density filter is controlled by a stepper motor that receives one or more control signals in accordance with the desired level.

3. An optical device comprising:
   a variable neutral density filter;
   a first grin lens to receive a signal having a wavelength $\lambda_i$;
   a first mirror receiving the signal from the first grin lens and reflecting the signal to the variable neutral density filter to be attenuated according to a desired level;
   an optical filter having a bandpass frequency profile centered at $\lambda_i$,
   a second grin lens;
   a second mirror receiving the attenuated signal with the wavelength $\lambda_i$ reflecting the signal to the optical filter that transmits the signal to the second grin lens; and
   wherein other channel signals with wavelengths $\lambda_1 \lambda_2 \ldots \lambda_N$ arrive at the second grin and are bounced out of the optical device with the signal included.

4. An optical device as recited in claim 3, wherein the variable neutral density filter is controlled by a stepper motor that receives one or more control signals in accordance with the desired level.

5. An optical device comprising:
   a reflection channel module including a collimator and an optical filter configured at a wavelength $\lambda_I$ and reflecting all channel signals with the wavelengths $\lambda_1 \lambda_2 \ldots \lambda_N$ except for a channel signal with the wavelength $\lambda_i$;
   an optical regulator receiving the channel signal with the wavelength $\lambda_I$ directly from the reflection channel module and regulating the channel signal according to a desired level;
   a transmission channel module receiving the regulated channel from the optical regulator and outputting the regulated channel out of the optical device, wherein the optical regulator is optically coupled between the reflection channel module and the transmission channel module,
   wherein means for coupling the channel signal from the reflection channel module to the optical regulator is a mirror, and
   wherein means for coupling the regulated channel signal from the optical regulator to the transmission channel module is another mirror.

6. An optical device as recited in claim 5, wherein the reflection channel module includes a first grin lens and an optical filter with a bandpass frequency profile centered at $\lambda_i$.

7. An optical device as recited in claim 6, wherein the transmission channel module include a second grin lens.

8. An optical device as recited in claim 7, wherein the optical regulator includes a variable neutral density filter and a stepper motor, the stepper motor controlled by one or more control signals to control operations of the variable neutral density filter.

9. An optical device as recited in claim 8, wherein the one or more control signals are in accordance with the desired level.

10. An optical device as recited in claim 8, wherein the optical regulator strengthens the signal according to the desired level.

* * * * *